2,763,589

FUNGICIDAL COMPOSITIONS OF N-PHENYL-CHLOROPHTHALAMIC ACIDS AND DERIVATIVES THEREOF AND METHOD OF APPLYING TO PLANTS

George E. O'Brien, Bethany, Allen E. Smith, Oxford, and Adelaide Bornmann, New Haven, Conn., assignors to United States Rubber Company, New York, N. Y., a corporation of New Jersey No Drawing. Application February 24, 1953, Serial No. 338,592

9 Claims. (Cl. 167—30)

This invention relates to new and useful improvements in fungicides. The invention further relates to methods of protecting organic material subject to attack by microorganisms, as the immunizing of seed and the treatment of growing plants.

We have found that N-phenyl-chlorophthalamic acids and N-substituted-phenyl-chlorophthalamic acids are effective fungicides. The phthalic ring may be mono- or polychlorinated. The phenyl ring attached to the nitrogen may be unsubstituted, or substituted, as halophenyl, nitrophenyl, alkylphenyl or hydroxyphenyl. The chemicals may be used as fungicides in the form of the free acids or their salts, esters or imides.

The N-phenyl-chlorophthalamic acids may be made in known manner by reacting equal molar amounts of the selected chlorophthalic anhydride with aniline or the selected substituted aniline in an inert solvent at room temperature. The mono- and dichlorophthalic anhydrides are available as technical chemicals as mixtures of the isomers. The imide may be formed by heating the N-phenyl-chlorophthalamic acid or by treating an alcoholic slurry of the acid with anhydrous hydrogen chloride. The salts may readily be formed directly from the acid and a suitable base such as an alkali-metal hydroxide or carbonate, or ammonia, or an amine. Polyvalent metal salts may be made indirectly, for example from an alkali salt of the acid and a water soluble salt of the desired cation. Copper, zinc, iron, lead, aluminum and calcium salts, for example, may be made by this procedure. The esters may be formed by the method of Human and Mills (J. Chem. Soc., 1949, Suppl. Issue No. 1, S 77–80). Examples of such esters are the methyl, ethyl, isopropyl, n-amyl, cyclohexyl, polyoxyethylene-ethyl, 2-phenoxyethyl, 2-chloroethyl, benzyl and phenyl esters.

The chemicals of the present invention may be used as seed protectants, and to protect growing plants from fungus infection. They may be applied to seeds and plants directly, or as a dust in admixture with a powdered solid carrier, such as the various mineral silicates, e. g. mica, talc, pyrophyllite and clays, or in aqueous solution or suspension, preferably with the addition of a surface-active wetting agent. Such surface-active agent may be anionic, non-ionic, or cationic, as shown in U. S. Patent 2,556,665. The chemicals may be mixed with powdered solid carriers, such as mineral silicates, together with a surface-active agent so that a wettable powder may be obtained which may be applied directly to plants, or which may be shaken up with water for application to plants in that form. The chemicals may be applied to plants by the aerosol method.

The following illustrates the invention:

The fungicides to be tested were ground with 7.5% of analkylphenoxy polyoxyethylene ethanol (monoether of a polyglycol with an alkylated phenol), a surface-active agent known to possess no fungicidal or fungistatic properties in the amounts used. The fungicide and surface-active agent were dispersed by thorough agitation in distilled water at a concentration of 2000 parts per million of fungicide.

Duplicate six-inch tomato plants of the variety Bonny Best were sprayed for 20 seconds at 20 pounds pressure with the aqueous dispersions of the various fungicides. After the spray deposit was thoroughly dry (24 hours), the plants and four comparable unprotected (control) plants were sprayed with an aqueous suspension of spores of the early blight fungus (*Alternaria solani*). The plants were held for 24 hours at 21° C. and 100 percent relative humidity to permit spore germination and host infection before removing the plants to the greenhouse. Records were taken 5 days later on the number of lesions produced on the 15 major leaflets of the three youngest fully expanded leaves. These data were converted to percentage of control on the basis of the average number of fungus lesions on the four control plants. Data on the amount of control afforded by the chemicals of the present invention are shown in the following table:

| Chemical: | Per cent fungus control |
|---|---|
| N-phenyl-monochlorophthalamic acid | 92 |
| N-(4-tolyl)-monochlorophthalamic acid | 82 |
| N-phenyl-monochlorophthalimide | 80 |
| N-(2-hydroxyphenyl)-dichlorophthalimide | 40 |
| N-(4-chlorophenyl)-tetrachlorophthalamic acid | 86 |
| N-(4-chlorophenyl)-tetrachlorophthalimide | 80 |

Other chemicals that may be used as fungicides according to the present invention are:

N-(4-nitrophenyl)-monochlorophthalamic acid
N-(4-nitrophenyl)-monochlorophthalimide
N-(3-chlorophenyl)-dichlorophthalamic acid
N-(2-nitrophenyl)-monochlorophthalamic acid
N-(4-hydroxyphenyl)-tetrachlorophthalamic acid
N-(2-ethylphenyl)-trichlorophthalamic acid
Sodium N-phenyl-dichlorophthalamate
Octyl N-(2-hydroxyphenyl)-trichlorophthalamate
Cupric N-(2-chlorophenyl)-monochlorophthalamate
Trimethylammonium N-(4-hydroxyphenyl)-monochlorophthalamate
Methyl N-(3-nitrophenyl)-dichlorophthalamate
N-(3-tert. butylphenyl)-trichlorophthalimide
N-(4-hydroxyphenyl)- tetrachlorophthalimide
N-(4-bromophenyl)-dichlorophthalimide

Having thus described our invention, what we claim and desire to protect by Letters Patent is:

1. A fungicidal composition comprising a compound selected from the group consisting of N-phenyl-chlorophthalamic acids and N-monosubstituted-phenyl-chlorophthalamic acids in which the substituent in the phenyl group attached to the nitrogen is selected from the group consisting of chloro, bromo, nitro, and hydroxy radicals and alkyl radicals having 1 to 4 carbon atoms, the chlorophthalamic group being unsubstituted except by 1 to 4 chloro radicals, and the imides, and the alkali-metal, ammonium, amine, copper, zinc, iron, lead, aluminum and calcium salts, and the methyl, ethyl, isopropyl, n-amyl, cyclohexyl, polyoxyethylene-ethyl, 2-phenoxyethyl, 2-chloroethyl, benzyl and phenyl esters of said acids, and a fungicidal adjuvant therefor, said adjuvant comprising a surface-active wetting agent.

2. The fungicidal composition of claim 1 in which the adjuvant includes a powdered solid carrier.

3. A fungicidal composition comprising N-phenyl-monochlorophthalamic acid and a fungicidal adjuvant therefor, said adjuvant comprising a surface-active wetting agent.

4. A fungicidal composition comprising N-(4-tolyl)- monochlorophthalamic acid and a fungicidal adjuvant therefor, said adjuvant comprising a surface-active wetting agent.

5. A fungicidal composition comprising N-phenyl-monochlorophthalimide and a fungicidal adjuvant therefor, said adjuvant comprising a surface-active wetting agent.

6. A fungicidal composition comprising N-(4-chlorophenyl)-tetrachlorophthalamic acid and a fungicidal adjuvant therefor, said adjuvant comprising a surface-active wetting agent.

7. A fungicidal composition comprising N-(4-chlorophenyl)-tetrachlorophthalimide and a fungicidal adjuvant therefor, said adjuvant comprising a surface-active wetting agent.

8. The method of controlling fungi on plants which comprises applying to plants that are subject to attack by fungi a fungicidal amount of a compound selected from the group consisting of N-phenyl-chlorophthalamic acids and N-monosubstituted-phenyl-chlorophthalamic acids in which the substituent in the phenyl group attached to the nitrogen is selected from the group consisting of chloro, bromo, nitro, and hydroxy radicals and alkyl radicals having 1 to 4 carbon atoms, the chlorophthalamic group being unsubstituted except by 1 to 4 chloro radicals, and the imides, and the alkali-metal, ammonium, amine, copper, zinc, iron, lead, aluminum and calcium salts and the methyl, ethyl, isopropyl, n-amyl, cyclohexyl, polyoxyethylene-ethyl, 2-phenoxyethyl, 2-chloroethyl, benzyl and phenyl esters of said acids.

9. The method for suppressing the growth of fungi on living plants which comprises spraying living plants which are subject to attack by fungi with a fungicidal amount of a compound selected from the group consisting of N-phenyl-chlorophthalamic acids and N-monosubstituted-phenyl-chlorophthalamic acids in which the substituent in the phenyl group attached to the nitrogen is selected from the group consisting of chloro, bromo, nitro, and hydroxy radicals and alkyl radicals having 1 to 4 carbon atoms, the chlorophthalamic group being unsubstituted except by 1 to 4 chloro radicals, and the imides, and the alkali-metal, ammonium, amine, copper, zinc, iron, lead, aluminum and calcium salts and the methyl, ethyl, isopropyl, n-amyl, cyclohexyl, polyoxyethylene-ethyl, 2-phenoxyethyl, 2-chloroethyl, benzyl and phenyl esters of said acids.

References Cited in the file of this patent

UNITED STATES PATENTS

| 2,598,562 | Kleiman | May 27, 1952 |
| 2,640,006 | Ligett et al. | May 26, 1953 |
| 2,657,169 | Ligett et al. | Oct. 27, 1953 |

FOREIGN PATENTS

| 671,153 | Great Britain | Apr. 30, 1952 |

OTHER REFERENCES

Siegler et al.: Journal of Economic Entomology, vol. 39, August 1946, page 549.